United States Patent Office 2,857,382
Patented Oct. 21, 1958

2,857,382

GUANAMINE DERIVATIVES

Peter L. De Benneville and Homer J. Sims, Philadelphia, Pa., assignors to Rohm & Haas Company, Philadelphia, Pa., a corporation of Delaware No Drawing. Application March 2, 1956
Serial No. 568,970

11 Claims. (Cl. 260—249.9)

This invention deals with a novel process for preparing 2,4-diamino-1,3,5-triazines substituted on the six-carbon of the triazine ring by an aliphatic carbon to which there is bonded a hydrxoy radical, herein referred to as α-hydroxyguanamines. This invention also deals with a new group of these α-hydroxyguanamines, more specifically those in which there is bonded to the α-aliphatic carbon in addition to the hydroxy group, two methyl radicals or a higher alkyl or an aryl radical, and those α-hydroxyguanamines in which the said α-hydrocarbon is part of a saturated aliphatic carbocycle.

Because of these distinctive features, this new group of hydroxyguanamines displays surprisingly beneficial qualities which may vary according to the specific radical bonded onto the α-carbon or depending on the specific radical of which the said α-carbon is part.

In this novel method for the preparation of α-hydroxyguanamines, we are able to use α-hydroxynitriles, herein referred to as α-cyanohydrins, as starting materials in spite of the fact that these compounds cannot be used in the conventional methods for preparing guanamines.

In the first step of our new method for preparing α-hydroxyguanamines, we treat the α-cyanohydrin in the presence of a small amount of an acidic catalyst with a vinyl ether, thereby making an addition product which is then reacted with dicyandiamide in the presence of a strong base, thereby forming an ether guanamine which is then hydrolyzed in the presence of an aqueous mineral acid to yield the α-hydroxyguanamine.

Our new and successful process involves this series of interdepending steps, each one performing a necessary and essential function and if each step is carefully followed, then, there is obtained according to the teaching of this invention α-hydroxyguanamines defined herein in very good yields, at a very high degree of purity, and at commercially reasonable costs.

The conventional method of preparing guanamines reacts dicyandiamide with a nitrile in the presence of a basic catalyst. This method, however, is unsuccessful for the preparation of α-hydroxyguanamines. The basic reason for this lack of success is that in order to prepare α-hydroxyguanamines from nitriles, it is necessary that the nitrile be an α-hydroxynitrile which being hopelessly unstable under the alkaline conditions of the conventional process decomposes before any guanamine is formed.

In another reaction, namely between ethyl lactate and biguanide, and apparently limited thereto, there is obtained some lactoguanamine. This method is particularly inefficient because of the difficulty in preparing the starting material biguanide and because of the low yield of the final product.

Consequently, at the present time, there is no adequate method for preparing α-hydroxyguanamines.

According to our invention, we may prepare any α-hydroxyguanamine including the group of new α-hydroxyguanamines defined herein and as yet not shown by the art. In the first important step of our new process, we react our starting material, the α-cyanohydrin, in the presence of a trace of an acidic catalyst with a vinyl ether to obtain with speed and ease an addition product, exclusively. Apparently, there is a special virtue in reacting with the α-cyanohydrin, a vinyl ether and not any other seemingly similar material. The presence of the reactive double bond and of the ether oxygen in the same compound make this first step a straight, clean-cut addition reaction; it is not an equilibrium reaction; there is no mixture of reaction products; there is no need for undue forcing of the reaction to completeness; nor is it necessary to continuously or intermittently remove side products since none are formed. The exclusive final product is a stable cyano compound which is then directly reacted with dicyandiamide to ultimately give the α-hydroxyguanamine.

The α-cyanohydrin which we react, in the first step of our process with the vinyl ether, has the following formula:

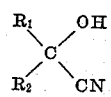

where the hydroxy and the cyano radicals are bonded onto the same carbon, and where $R_1$ and $R_2$, which may be the same or different, are, when taken individually, hydrogen or monovalent saturated straight or branched chain aliphatic hydrocarbon radicals, or $R_1$ is a monovalent aromatic radical, $R_2$ then being as defined above, in each case $R_1+R_2$ not totaling more than 20 carbon atoms, or when $R_1$ and $R_2$ are taken together with the carbon to which they are both bonded, they form an alicyclic divalent saturated hydrocarbon radical limited to ten carbon atoms, having one valence of the α-carbon bonded to the hydroxyl group and the other to the cyano group which later becomes part of the triazine ring.

However, as we show further below, the process of this invention is effective regardless what radicals $R_1$ and $R_2$ represent, since they are inert, non-interfering radicals in the reactions of this process, provided that $R_1$ and $R_2$ taken individually or together with the carbon atom on which they are both bonded are selected from the group consisting of hydrogen and hydrocarbon groups free from acetylenic or olefinic unsaturation. $R_1$ and $R_2$ are then aromatic or saturated aliphatic hydrocarbon groups, and the limitation placed on the number of carbon atoms of these radicals is merely because the starting compounds so defined are more readily available than those of higher molecular weight.

The cyanohydrins which we use as starting materials in this invention are conveniently prepared by methods known in the art such as for instance from the reaction of hydrocyanic acid and aldehydes in the presence of a basic catalyst generally or from the aldehyde or ketone bisulfite addition product and sodium cyanide. Amongst the aldehydes which may be used are formaldehyde, acetaldehyde, propionaldehyde, normal and isobutyraldehyde, valeraldehyde, pelargonaldehyde, stearaldehyde, and arachidaldehyde; also, benzaldehyde, naphthaldehyde, and other aromatic aldehydes, such as p-ethylbenzaldehyde, mesitylaldehyde, 1,3-diethylbenzaldehyde, tolualdehyde, p-isopropylbenzaldehyde, 2-ethyl-1-naphthaldehyde, 2,3-dimethoxybenzaldehyde, and methoxybenzaldehyde which are substituted with radicals that are not interfering in the reactions of the process of this invention. Ketone cyanohydrins are also suitable as starting materials in this process as reactants with a vinyl ether. These ketone cyanohydrins are derived from ketones such as acetone, methyl ethyl ketone, diethyl ketone, phenylisopropyl ketone, acetophenone, propiophenone, and cycloaliphatic ketones such as cyclohexanone, cyclopentanone, 2-methylcyclohexanone, 2,4-diethylcyclohexanone, 4-methcyclohexanone, and methylcyclopentanone.

It should be noted that it is the ketones and the aldehydes, some of which are named above, which provide the $R_1$ and $R_2$ substituents which are found intact in the α-cyanohydrin. Therefore, when the α-cyanohydrin is derived from an aldehyde either $R_1$ or $R_2$ is hydrogen and usually $R_1$ and $R_2$ are not the same radicals; when the α-cyanohydrin is a ketone derivative, then $R_1$ and $R_2$ are never hydrogen atoms.

Some illustrations of the α-cyanohydrins which are derived from the corresponding aldehydes or ketones and which can be used as starting materials in the process of this invention are hydroxyacetonitrile, also named herein glycolonitrile, α-hydroxypropionitrile, α-hydroxybutyronitrile, α-hydroxyoctanenitrile, α-hydroxyvaleronitrile, α-hydroxyhexadecanenitrile, α-hydroxyeicosanenitrile, and α-cyanohydrins substituted on the α-carbon by alkyl radicals such as in α-hydroxy-isobutyronitrile, α-hydroxy-α-ethylbutyronitrile, α-hydroxy-α-hexyloctanenitrile, α-hydroxy-α-dodecyloctanenitrile, α-hydroxy-α-ethylvaleronitrile, α-hydroxy-α-pentylpentanenitrile, any isomers of the foregoing, and α-cyanohydrins substituted on the α-carbon by aryl and aralkyl radicals such as benzaldehyde cyanohydrin, p-tolualdehyde cyanohydrin, acetophenonecyanohydrin, butyrophenonecyanohydrin, valerophenonecyanohydrin, β-acetonaphthonecyanohydrin, tridecanophenonecyanohydrin, and such cyanohydrins as those derived from the following ketones: 1-cyclohexyl-2-methyl-1-propanone, 1-cyclohexyl-2-propyl-1-hexanone, 1-cyclohexyl-2-butyl-1-decanone, and the like, also, the cycloaliphatic cyanohydrins like cyclohexanonecyanohydrin, 2-methylcyclohexanonecyanohydrin, cycloheptanonecyanohydrin, and the like.

It should be noted this last group of α-cyanohydrins represents the case where $R_1$ and $R_2$ taken together and with the carbon unto which $R_1$ and $R_2$, the cyano, and the hydroxy groups are all bonded, form a saturated cycloalkyl radical.

Regardless of which one of the above defined radicals $R_1$ and $R_2$ represent, $R_1$ and $R_2$ appear on the aldehyde or on the ketone and also on the original α-cyanohydrin and finally again appear intact on the α-hydroxyguanamine in the same position in relation to the hydroxy group. The reason for this stability is because $R_1$ and $R_2$ are inert radicals in the steps of this new process to prepare α-hydroxyguanamines.

We have found that the success of the process of this preparation in great part depends on the fact the α-cyanohydrin defined above is reacted with a vinyl ether. In order to obtain a continuous process and to obtain an initial reaction proceeding with surprising facility and efficiency, it is essential that the special vinyl ether we use is a vinyloxy substituted hydrocarbon compound which conforms to the following general formula:

$$R_3\text{---}O\text{---}CH=CH_2$$

where $R_3$ is a monovalent hydrocarbon free of acetylenic or olefinic unsaturation which may be saturated aliphatic or aromatic and which preferably is limited to 18 carbon atoms for practical reasons. As illustrative examples $R_3$ may be alkyl, cycloalkyl, aralkyl, aryl and alkaryl. Among the radicals which $R_3$ may represent are methyl, 3-butyl pentadecyl, n-amyl, n-hexyl, decyl, hexadecyl, octadecyl, phenyl, benzyl, ethylbenzyl, ethylphenyl, phenylethyl, phenylpropyl, naphthyl, 1,4-dimethylnaphthyl, and lower alkoxy substituted aryl radicals.

$R_3$ being an inert radical which does not interfere in the reactions of this preparation of α-hydroxyguanamines, the limitations which are placed on the number of carbon atoms of the radical are merely placed thereon because the compounds so defined are more readily available than others of higher molecular weight which can also be used in this process.

Some of the ethers which are included in the above formula and which we have found to be well suited in the reaction with the α-cyanohydrin are n-butyl vinyl ether, ethyl vinyl ether, n-propyl vinyl ether, n-amyl and isoamyl vinyl ether, n-hexyl vinyl ether, phenyl vinyl ether, benzyl vinyl ether, and the like.

The particular ether which is selected may depend on the temperature at which it is desired to carry out the reaction with the particular α-cyanohydrin selected.

Customarily, because of the very efficient reaction obtained, the vinyl ether is added at a rate slow enough to prevent a build-up of vinyl ether which might result in a reduced boiling point, and/or to prevent possible polymerization of the vinyl ether. Since the reaction between the α-cyanohydrin and the vinyl ether is exothermic and, therefore, can be easily maintained at any desired temperature, there is a great number of ethers that are operative in this reaction. Furthermore, if the particular α-cyanohydrin is one which reacts best with the vinyl ether at a higher temperature, it may be convenient to select a vinyl ether with a correspondingly higher boiling point and to gradually feed the vinyl ether in small amounts to the reaction mixture until all the α-cyanohydrin is used up in the reaction.

The temperature at which the reaction between the vinyl ether and the α-cyanohydrin proceeds is within the range from about 0° to 120° C.; preferably the reaction temperature is maintained between about 50° and about 100° C. where the speed of reaction is a very convenient one.

In order that the reaction be successful, we further have found that the α-cyanohydrin and the vinyl ether must be reacted in the presence of a small amount of an acidic catalyst. It appears that the acidic catalyst is capable of entering into an unique combination with the α-cyanohydrin and the vinyl ether and thus catalyze their reaction with surprising speed and efficiency.

The acidic catalysts which must be present include, for example, mineral acids, such as hydrochloric, hydrobromic, hydroiodic, phosphoric, or sulfuric, or catalysts such as calcium chloride, zinc chloride, ferric chloride, boron trifluoride, or ammonium chloride, and the like.

Exchange resins, such as for example, cross-linked sulfonated polystyrene cation-exchange resins also are effective catalysts. The mineral acids, such as hydrochloric acid, sulfuric acid being particularly efficient, are the preferred catalysts.

It is sufficient that the acid catalyst be present in an amount sufficient to catalyze the reaction between the vinyl ether and the α-cyanohydrin at a convenient speed. A trace is usually quite sufficient. In fact, quite often the acid present as stabilizer in commercially available α-cyanohydrins is quite sufficient to catalyze the reaction and no further addition is needed. When no acid stabilizer is present in the α-cyanohydrin, the acidic catalyst is mixed with the α-cyanohydrin in an amount from about 0.01% to about 3% by weight preferably from about 0.1% to about 0.5% by weight, or the catalyst may be added in an amount sufficient to bring the hydrogen ion concentration below a pH of 7.0 preferably within a pH range from about 3.0 to about 5.0. An excess of acidic catalyst unnecessarily dilutes the reactants. The acidified α-cyanohydrin is then ready for use in the reaction with the vinyl ether.

The acid catalyzed reaction between the α-cyanohydrin and the vinyl ether proceeds exclusively between one mole of each of the two reactants. The vinyl ether is fed gradually to the acidified α-cyanohydrin until there is present one mole of vinyl ether for each mole of α-cyanohydrin, and at the end of the reaction there is only formed an addition product of the two initial reactants. No other product contaminates the reaction-addition product which without any further purification may be isolated or preferably directly used in the next step of the reaction of this novel process. Since the vinyl ether may be added in excess over the α-cyanohydrin it is conveniently removed by distillation, for example, before proceeding to the next step of the process.

It is a marked advantage of our preparation of α-hydroxyguanamines from α-cyanohydrins that the process may be continuous and that the α-cyanohydrin-vinyl ether addition product can be directly reacted in the next step of the reaction with dicyandiamide of the formula

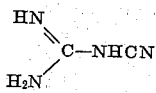

in the presence of a strong base and an alcoholic solvent under refluxing to form ether guanamines.

In this second step of the reaction of the α-cyanohydrin-vinyl ether addition product and the dicyandiamide, there is reacted about one mole of the dicyandiamide for each mole of α-cyanohydrin. Some excess, such as about 1.2 mole of dicyandiamide may be used and there may be present as much as about 1.5 mole or as little as about 0.9 mole of dicyandiamide for each mole of α-cyanohydrin.

Addition of smaller or larger amounts of dicyandiamide is also feasible but undesirable since this is conducive to a waste of reactants. The molar proportions between the dicyandiamide and the α-cyanohydrin are the same as the molar proportions between the dicyandiamide and the addition product of the vinyl ether and the α-cyanohydrin, since all these reactants are present in equimolar amounts.

In the practice of our invention the reaction with the dicyandiamide is carried out in the presence of a strong base, i. e., a substance that is at least as strongly basic as potassium carbonate. Examples of such bases include the alkali metal hydroxides, alkali metal alkoxides, such as potassium hydroxide, sodium hydroxide, sodium ethoxide, sodium methoxide, sodium β-methoxyethoxide, and quaternary ammonium bases such as trimethylbenzylammonium hydroxide, (β-hydroxyethyl)trimethylammonium hydroxide, tetraethylammonium hydroxide, tetramethylammonium hydroxide, and triethylbenzylammonium hydroxide.

The proportion of the base which is used may range from the smallest amount which will cause an appreciable reaction to an amount which causes a maximum practical speed of reaction. This proportion is from about 5 mole percent to about 60 mole percent of base calculated on the basis of the weight of the α-cyanohydrin. When the base is present in an amount from about 10 mole percent to about 40 mole percent based on the weight of the α-cyanohydrin a practical and efficient rate of reaction is obtained and this range is therefore preferred.

In addition to the strong base the reaction of the dicyandiamide and the addition product of the α-cyanohydrin and the vinyl ether is carried out in the presence of an inert organic solvent, or there may be used the addition product of the first reaction of this process or preferably an alcoholic solvent such as primary, secondary, or tertiary alcohols, and the preferred group of alcoholic solvents are those whose boiling range is from about 63° to 210° C. Some examples of such solvents include methanol, ethanol, propanol, t-butylalcohol, isopropanol, n-butanol, sec-butanol, β-methoxyethanol, β-ethoxyethanol, β-butoxyethanol, isoamyl alcohol, t-amyl alcohol, n-amyl alcohol, benzyl alcohol, n-octyl alcohol, 1,2-ethanediol and mixtures thereof. There should be added enough alcoholic solvent to give good and continuous mixing during the reaction. This is usually satisfactorily accomplished when there is present from about two to about four times the combined weight of the base, the dicyandiamide and the α-cyanohydrin vinyl ether addition product.

The reaction of the dicyandiamide with the addition product of the α-cyanohydrin and the vinyl ether in the presence of the basic catalyst and the alsoholic solvent is carried out at the temperature range from about 63° to 210° C. and preferably in the range from about 70° to 130° C. The reaction is desirably under refluxing conditions; it may be carried out at atmospheric pressure or not.

At this stage of this process, namely at the end of the second step of this novel preparation of α-hydroxyguanamines, there is obtained a group of acetal guanamines which may be isolated, if desired, or reacted directly to prepare the α-hydroxyguanamines. The acetal guanamines which may be collected, if desired, at this stage, are produced in very good yield, and may be represented by the following formula:

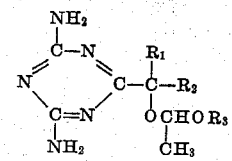

where $R_1$, $R_2$ and $R_3$ are defined above. These acetal guanamines are further characterized by the unique feature of having an ethane radical, two hydrogen atoms of which have been substituted by ether oxygens, one ether oxygen being bonded unto $R_3$ and the other ether oxygen being bonded either unto the carbon onto which $R_1$ and $R_2$ are bonded or unto the cycloaliphatic ring which $R_1$ and $R_2$ may form when $R_1$ and $R_2$ are taken together.

These ethane-acetal substituted guanamines are useful compounds which condense readily with formaldehyde and with reactive urea-formaldehyde condensation produces to produce synthetic resins. In the presence of butanol or other appropriate alcohol, these acetal guanamines form low viscosity products which are useful modifiers for alkyd resins. On addition of the condensates of these acetal guanamines and formaldehyde, there are obtained improved compositions giving resinous films of marked toughness, durability, and flexibility. The resinous products so prepared are useful as coatings and for impregnating paper and, furthermore, the acetal ether guanamines prepared by this new process are intermediates from which the α-hydroxyguanamines are prepared according to this invention.

Although, if desired, the acetal guanamines may be isolated, such isolation is not necessary in this novel process of preparing α-hydroxyguanamines, especially if it is desired to make this preparation a continuous one.

We have found that the acetal guanamines when reacted with an aqueous solution of a catalytic amount of an acid catalyst give α-hydroxyguanamines in excellent yield and in a very high degree of purity. Actually, the acid catalyst serves a dual purpose, since the acetal guanamines are more soluble under acidic conditions, the acid catalyst gradually dissolves the acetal guanamines and concurrently hydrolyzes the dissolved guanamine to form the α-hydroxyguanamines. The acid catalyst which may conveniently be used is of a mineral acid type such as sulfuric, hydrochloric, hydrobromic, hydroiodic, or phosphoric acid.

The acid catalyst is used in a catalytic amount sufficient to catalyze the hydrolysis of the ether guanamine. Alternatively, if desired to accelerate the reaction, a greater amount of acid may be provided. There may be present from about 0.001 to 1.5 moles of acid and, conveniently, there may be present from about 0.1 to about 1.0 mole of acid for each mole of α-cyanohydrin originally taken, or for each mole of acetal guanamine if isolated. A very quick method to dissolve and hydrolyze the acetal guanamine is to add one mole of it to an aqueous solution containing one mole of a mineral acid catalyst or correspondingly more acid when more acetal guanamine is used. However, a trace of acid is sufficient for those acetal guanamines which require a very small amount of acid to dissolve.

The temperature at which this reaction is effectuated is not critical, the α-hydroxyguanamine being obtained when the reaction proceeds within the range from about 20° to 130° C. using pressure if desired. Preferably, because of the convenience of the rapidity of the reaction this step of the process is carried out within the range from about 75° to about 100° C.

The α-hydroxyguanamines may then be obtained by neutralization of any mineral acid present with any convenient base such as with sodium or potassium hydroxide and the like. There is the added advantage that very little base, if any, is required for neutralization in the case of those acetal guanamines which are easily dissolved and hydrolyzed in a very small amount of mineral acid. If desired, the α-hydroxyguanamine may then be further purified by redissolving in a solvent and recrystallization by cooling.

The α-hydroxyguanamines of which a large number were unknown heretofore but which are all prepared according to our novel process can be represented by the following formula:

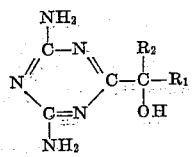

where $R_1$ and $R_2$ are defined as above; these α-hydroxyguanamines are very useful compounds by virtue of the reactiveness of the amine groups which apparently is modified and also accentuated by the characteristic reactiveness of the α-hydroxy group. To this distinct reactiveness there is combined the effect imparted by the $R_1$ and $R_2$ substituents, so that the α-hydroxyguanamines made by our process all have certain common beneficial uses. Moreover, some of them also have specific distinctive utility depending on the nature of the $R_1$ and $R_2$ substituents. Thus, the α-hydroxyguanamines made by our process can be reacted with aldehydes, such as formaldehyde, and its addition products in the presence of a lower alcohol. The hydroxymethylated compounds so formed are valuable as coatings, films, linings, as base coats on paper, fabrics, and rubber, in moldings and similar applications. The methylolated α-hydroxyguanamines, furthermore, are especially desirable modifiers for alkyd resins. They are important in modifying such properties as drying characteristics, viscosity, vehicle solids, stability with pigments, and color retention. The improved alkyd resins are useful components for additives for paper, plywood, leather products, and similar applications. Moreover, the α-hydroxyguanamines prepared by our process are useful corrosion inhibitors such as in pickling baths.

In addition to these beneficial properties the α-aromatic substituted α-hydroxyguanamines, such as mandeloguanamine made by our process show surprisingly different qualities. Mandeloguanamine, for example, shows parasiticidal properties with desirable lethal effect on pathogenic protozoans. Malaria, for instance, is a serious disease known to be caused by such parasites. This group of α-aromatic substituted α-hydroxyguanamines is thus useful for the preparation of disinfectants and other pharmaceutical and medical preparations of specialized uses. Moreover, this group of α-hydroxyguanamines show good solubility in hydrocarbon solvents which is a desirable feature in the preparation of compounds for the healing arts.

2 - (2,4 - diamino - 6 - s - triazinyl) - 2 - propanol has been found to be an effective rodent repellent agent. Food acceptance tests in which individual rats are given two feed cups, one containing 20 gms. of untreated food, the other 20 gms. of food with 2% of the α-hydroxyguanamine show that during 48 hours the rodents substantially only feed an untreated food, leaving the treated food untouched. This distinct repellence persists also over a longer period of time. 2-(2,4-diamino-6-s-triazinyl)-2-propanol appears somewhat more effective over a longer lapse of time than 1-(2,4-diamino-6-s-triazinyl)-1-ethanol.

In contrast, the α-higher alkyl and cyclo alkyl substituted α-hydroxyguanamines and more particularly 1-(2,4-diamino-6-s-triazinyl)cyclohexanol, 1-(2,4-diamino-6-s-triazinyl) - 3,5,5 - trimethyl - 1 - hexanol, 1 - (2,4 - diamino-6 - s - triazinyl) - 1 - hexanol, and 1 - (2,4 - diamino - 6-s - triazinyl) - 2 - ethyl - 1 - hexanol while possessing the above described properties common to all the α-hydroxyguanamines also show unusual properties when the corresponding methylolated α-hydroxyguanamine is used in the treatment of textiles, paper and cellulosic material. For instance, they impart to the fabric desirable long lasting anti-crease, shrinkage and wrinkle resistance, and crush proofing properties. These useful properties are shown by the following test in which the resin is the methylolated composition prepared from the higher alkyl and cycloalkyl α-substituted hydroxyguanamines shown above and in which all parts are by weight. A cotton fabric impregnated with the resin solution is dried on a convenient drying equipment such as a loop drier or a pin tenterframe and then heated for about three minutes at 330° F. to uniformly cure the resin. The treated material is scoured in an effective washing formula containing 0.05% soda ash and 0.01% of a detergent and wetting agent such as Triton X-100 or Triton 770 concentrate for five minutes at about 120° F. and the treated cloth is dried. Samples of the treated fabric show good resistance to shrinkage, a markedly low percentage loss of tensile strength, very good recovery from crease and good wrinkle resistance. In addition, these higher alkyl and cycloalkyl α-substituted hydroxyguanamines, having distinct hydrophobic qualities apparently due to the combination and position of the hydroxy group with respect to the alkyl radical, seem to impart some of this quality to the composition in which they are used.

The methylolated higher alkyl α-substituted α-hydroxyguanamines, such as those from 8-(2,4-diamino-6-s-triazinyl) - 8-nonadecanol, 5-(2,4-diamino-6-s-triazinyl)-5-dodecanol, 4-(2,4-diamino-6-s-triazinyl)-4-tridecanol, and similar ones are also very useful because of their compatability with common drying oils which are used in conjunction with the modified and improved resins.

The α-hydroxyisobutyroguanamine, when methylolated, and used in the treatment of textile fabrics, is a superior agent for imparting crush-proofing and stabilization characteristics to textiles which are then resistant to washing and bleaching with chlorine. This is very significant in the textile industry which strives to prepare treated fabrics which are resistant to repeated washings and bleaching with chlorine. Methylolated α-hydroxyisobutyroguanamine is prepared by mixing to 25 parts of the α-hydroxyisobutyroguanamine, 38 parts of 36.4% aqueous formaldehyde and 30 parts of water to a three-necked flask fitted with stirrer, thermometer and condenser. The pH is adjusted to within a range of 8.5–8.8 and the mixture is heated at 55°–60° C. for one-half hour and the clear resin comes and out of solution. It analyzes 1.48 free formaldehyde and 37.5% solids. The resin is then used to impregnate and treat the fabric as shown above. The fabric is then passed through the Full Sanforized Chlorine Wash according to the Federal Specification Procedure CCC–T–191–A. test. The tests show loss in tensile strength and chlorine damage to be very low, and resistance to chlorine damage and loss in tensile strength imparted in this manner by this preparation to the fabric is remarkable. The preparation of these useful α-hydroxyguanamines is further described below in details.

To one mole of the particular α-cyanohydrin which is selected, in this case α-hydroxy-α-ethylpropionitrile, there is added a small amount of acid catalyst such as for instance hydrochloric acid in a concentration of about 0.1% to about 0.5% by weight. Alternatively, enough acid type catalyst may be added until the hydrogen ion concentration is between a pH of about 3.0 to about 5.0. The α-cyanohydrin is charged to a three-necked balloon flask equipped with a stirrer, an inlet having a stopcock and a thermometer. The vinyl ether, for example, n-butyl vinyl ether is gradually fed to the α-cyanohydrin at a controlled rate.

The reaction being exothermic the temperature usually rises to at least 50° C. If the temperature is below, it is desirable to heat the flask by immersing it for instance in an oil bath maintained within the temperature range of 50° C. to about 100° C. If the temperature of reaction exceeds 100° C., it is advisable to cool the flask by an appropriate cooling system. The reaction proceeds with surprising ease as the gradual addition of the vinyl ether is continued through the inlet and it is completed when there has been added to the 1 mole of α-cyanohydrin one mole of n-butyl vinyl ether. The reaction goes to completion in a comparatively short time about an hour or two. The addition product of the α-cyanohydrin and vinyl ether which is formed is uncontaminated by by-products; it is the exclusive product formed and if desired it may be removed from the flask and stored for further use. Preferably, however, this addition product which is extremely pure is directly used in the next reaction. The flask is now equipped with a reflux condenser and there is charged to the flask containing the liquid product of the first reaction dicyandiamide, alcoholic solvent and basic catalyst, there being present 1.2 moles of dicyandiamide, from about 10 to about 40 mole percent of basic catalyst for each mole of original α-cyanohydrin, and alcoholic solvent such as isopropyl alcohol in an amount from three to four times the combined weight of all ingredients. The charge is stirred, and as the temperature is gradually raised by immersing the flask in an oil bath, boiling begins and more reactants go into solution. The reaction is continued under reflux conditions, usually under atmospheric pressure, the temperature then preferably being from about 70° to 130° C. for about two hours and then refluxing is continued for several hours sometimes up to about 18 hours. This depends on the reactiveness of the α-cyanohydrin vinyl ether addition product which is used and the particular vinyl ether selected. As the reaction proceeds, the amount of solid present in the reaction mixture increases, while thorough agitation of the slurry of the reactants and the solvent is being maintained. After the reaction has been carried out to completion, the flask is removed from the oil bath and cooled to about room temperature. In most cases the ether guanamine separates out as a crystalline solid which may then merely be removed by filtration and washed with water to remove traces of alkaline catalyst. In the case of the α-higher alkyl-substituted α-hydroxy-guanamines the alcohol solvent may be removed by evaporation, water is added and the ether guanamine is extracted from the mixture with an organic solvent. After separation the solvent is evaporated to yield the pure ether guanamine. The ether guanamine in this case 1-butoxy-1[α(2,4-diamino-6-s-triazinyl-α-ethyl)-propanoxy]ethane may be further purified if desired; the yields are usually very good and the product is very pure. The ether guanamine may directly be used in the next step of the process after isolation or alternatively without isolation of the ether guanamine. There may be added to the reaction mixture enough aqueous mineral acid to neutralize all the strong alkali used in second step of the process and enough excess to give the required acidity. Conveniently, to one mole of the ether guanamine, there is fed an aqueous solution of a mineral acid catalyst such as for instance sulfuric acid in concentration from about 0.1 to about one mole for each mole of ether guanamine. The mixture is heated to within the range of about 75° to about 100° C. by immersing the flask into the oil bath for about two hours at the end of which, upon cooling, the guanamine hydrochloride separates out; this product which is pure 3-(2,4-diamino-6-s-triazinyl)-3-pentanol may then be redissolved in hot water and the free α-hydroxyguanamine precipitated out upon addition and neutralization with a base such as sodium hydroxide.

The remarkable yields, which usually are above 90% and the high-grade purity, in which we obtain these α-hydroxyguanamines by our preparation, are additional distinctive features of our new method of preparation of α-hydroxyguanamines.

This invention is further described by the following examples in which all parts are by weight.

*Example 1*

81.5 parts of 70% aqueous commercial glycolonitrile, (hydroxyacetonitrile), is stripped under aspirator vacuum to remove the water then acidified with about 0.1 part of 5% hydrochloric acid, and while under stirring in a flask adapted with a mechanical stirrer, there are added gradually 100 parts of (one mole) n-butyl vinyl ether while the temperature is controlled by a cooling system to keep it within the range of about 50° to 80° C while stirring is continued for two hours at the end of which all of the n-butyl vinyl ether has been added. Heating and stirring is continued for another two hours. To this solution there is then fed a mixture of 130 parts of dicyandiamide and 525 parts of isopropanol while stirring. To the flask there is adapted a reflux condenser and the mixture is then brought to refluxing conditions. A solution of 39 parts of potassium hydroxide in 700 parts of isopropanol is added over a period of two hours. The temperature is maintained within the range of 80° to about 100° C. and after refluxing for a total of 18 hours the mixture is cooled by placing the flask into a cooling water bath. The precipitate which comes out of solution is filtered off, washed with portions of hot water and dried to produce a 73% yield of the ether guanamine 1-butoxy-1-[α(2,4-diamino-6-s-triazinyl)methoxy]ethane. The crude product which is light yellow melts at 146°–150° C., has a nitrogen content of 28.7%, calculated 29%. After recrystallizing from water, a sample melts at 150°–153° C. and has a 28.9% nitrogen content. Twenty eight parts of this acetal guanamine are added to a solution of 10 parts of concentrated hydrochloric acid in 100 ml. of water. The mixture is gently heated for three hours at about 100° C. The solution is treated with 4.5 parts of sodium hydroxide dissolved in 50 parts of water. The α-hydroxyguanamine, glycologuanamine, is filtered and dried giving a pure white product in 93% yield, and a sample melting at 286°–288° C. has a nitrogen content of 48.9%, calculated 49.7%.

*Example 2*

The same procedure as in Example 1 is repeated and the addition product of the glycologuanamine and of the n-butyl vinyl ether is collected. This product distills at 52°–56° C. and 1 mm. of pressure; the yield is 91% of theory, nitrogen analysis shows 9.1% as against a calculated value of 8.9%. This product may then be directly reacted in the same procedure as in Example 1.

*Example 3*

By a similar procedure glycologuanamine is prepared by reacting with one mole (57.0 parts) of α-hydroxyacetonitrile with one mole (120 parts) of benzyl vinyl ether and reacting the addition product similarly as in Example 1 to give the acetal guanamine 1-benzoxy-1-(2,4-diamino-6-s-triazinyl methoxy)ethane which upon treatment like in Example 1 yields glycolguanamine.

Example 4

71 (one mole) parts of freshly distilled α-hydroxy propionitrile is acidified with about 0.2 parts of 5% aqueous hydrochloric acid and, while mixing, 72 (one mole) parts of ethyl vinyl ether are gradually added thereto. The addition of the ether is controlled to keep the temperature within the range of about 50° to 70° C., and when the reaction is completed, heating is continued for a total of three hours. Then, there is prepared a mixture of 80 (one mole) parts of dicyandiamide and 530 parts of methyl Cellosolve and 39.2 parts of potassium hydroxide in a flask filtered with a reflux condenser, a thermometer, and an inlet tube to which 235 parts of reaction product of the nitrile and vinyl ether is gradually fed while the temperature is raised to about 125°–130° C. After refluxing for about 15 hours, the mixture is cooled and the precipitate which is formed is filtered and washed yielding 78% of 1-ethoxy-1-[α(2,4 - diamino-6-s-triazinyl)ethoxy] - ethane. The dry pure acetal guanamine melts at 165°–169° C and nitrogen analysis gives 27.4% nitrogen, calculated nitrogen is 27.4%. When 25.5 parts of the ether guanamine are added to a solution of 10 parts of sulfuric acid in 100 ml. of water, and the mixture is heated for about two hours at about 80° C., then cooled and neutralized with sodium hydroxide, there is collected the 1-(2,4-diamino-6-s-triazinyl)-1-ethanol also named lactoguanamine in 93% yield. Its composition was confirmed by analysis and this product melts at 165°–169° C. and nitrogen analysis shows 27.4%, calculated nitrogen is 27.4%.

Example 5

The preparation of 1-(2,4-diamino-6-s-triazinyl)-1-butanol is carried out starting with α-hydroxyvaleronitrile (99 parts) and reacting it with 120 parts of phenyl vinyl ether in the presence of enough sulfuric acid to bring the pH below 3.0, and the procedure proceeds like in Example 4. The acetal guanamine 1-phenoxy-1-[α(2,4-diamino-6-s-triazinyl)n-butoxy]ethane which is obtained is directly hydrolyzed following the same procedure as in Example 4 yielding a pure 1-(2,4-diamino-6-s-triazinyl)-1-butanol.

In a similar way, the αhydroxycyanohydrin derived from 3,5,5-trimethylcaproaldehyde is treated to yield 1-(2,4-diamino-6-s-triazinyl)-3,5,5-trimethyl-1-hexanol.

Example 6

One mole of α-hydroxydecanenitrile is acidified with sufficient sulfuric acid to bring the pH below a pH of 3.5, and one mole n-butyl vinyl ether is gradually added following the same procedure as in Example 2 and the resulting product is reacted with a mixture of 1.2 mole of dicyandiamide, 20 mol percent based on the weight of the α-hydroxydecanenitrile of a solution of sodium methoxide in n-butyl alcohol. After the start of the reaction, the temperature is maintained within the range of about 118° to 120° C. by immersing the flask containing the reactants in an oil bath for a total of 12 hours. After cooling the mixture, the solid is filtered off and it is mixed into a solution of one mole of hydrochloric acid in 100 ml. of water. The mixture is heated in a flask on a steam bath for a total of two hours, then cooled and neutralized with potassium hydroxide; the resulting 1-(2,4-diamino-6-s-triazinyl)-1-nonanol is collected in good yield and its composition is confirmed by analysis.

Example 7

125 parts of freshly distilled cyclohexanone cyanohydrin is acidified with 0.3 part of 5% hydrochloric acid which is enough to bring the pH below 7.0 and 72 parts of ethyl vinyl ether are added slowly while stirring and the temperature is taken up and maintained to within the range of 50°–70° C. As this reaction subsides the temperature is maintained for an additional two hours at about 90° C. The reaction product is obtained in 87% yield and it has a B. P. of 70°–75° C. at 0.7 mm. pressure. Nitrogen analysis of a sample gives 7.3% nitrogen, calculated 7.1% and the index or refraction $n_D$ is 1.4470 at 25° C. The preparation is continued by adding to 98.5 parts of the product of the above reaction 80 parts of dicyandiamide and 28 parts of potassium hydroxide and enough t-butyl alcohol to make a slurry. The reactants are taken and maintained at a temperature of about 83° C. for two hours, and after further heating for an additional two hours the 1-ethoxy-1-[1-(2,4-diamino-6-s-triazinyl)cyclohexoxy]ethane is collected and after washing the product with water it is collected in 85% yield; the product melts at 220°–222° C., and nitrogen analysis gives 24.8% against the calculated value of 24.9%. 28 parts of this acetal guanamine are added to aqueous sulfuric acid, and after heating for four hours the solution is neutralized with sodium hydroxide and the 1-(2,4-diamino-6-s-triazinyl)cyclohexanol is obtained in 91% yield; it has a melting point of 209° C. and nitrogen analysis shows 33.3% nitrogen, calculated value is 33.5%.

Example 8

122 parts of benzaldehyde cyanohydrin in a flask is made acid enough with 5% aqueous hydrochloric acid to bring the pH to about 4.0, and while stirring actively there is added at a controlled rate to the cyanohydrin a total of 66 parts of ethyl vinyl ether. The ingredients are heated to within a temperature range of 50° to 75° C.; the reaction proceeding with ease is completed within three and one-half hours when all of the vinyl ether has been added and reacted. The reaction product is stirred with 80 parts of dicyandiamide, about 40 parts of potassium hydroxide, and about 550 parts of isopropanol which is enough to make a slurry of the reactants which then are heated. Refluxing is continued for about 15 hours at the end of which the mixture is cooled and the reaction product, the acetal guanamine, is collected by filtration and washed with water. This product, 1-ethoxy-1-[α-(2,4-diamino-6-s-triazinyl)benzoxy]ethane is collected in 75% yield and it has a melting point of 189°–192° C. Nitrogen analysis gave 24.5% nitrogen, calculated 24.2% nitrogen. To 72 parts of the ether guanamine, there is added aqueous sulfuric acid (50 parts) and the mixture is heated on a steam bath at about 90° to 100° C. for about three hours, then cooled and neutralized with a solution of sodium hydroxide. The product α-(2,4-diamino-6-s-triazinyl)benzyl alcohol is obtained in 90.5% yield. Its composition is conformed by analysis; the melting point is 182°–190° C. and nitrogen analysis gives 30.7% nitrogen while calculated is 31.0% nitrogen.

Example 9

127 g. of α-hydroxy-α-ethylvaleronitrile are reacted with 120 g. of phenyl vinyl ether following the same procedure as described in Example 8. 219 grams of the addition product which is formed are reacted with 126 g. of dicyandiamide, 28 g. of sodium hydroxide, and 500 g. of n-butyl alcohol. The ether guanamine 1-phenoxy-1-[α-(2,4-diamino-6-s-triazinyl-α-ethyl)n-butoxy]ethane is reacted with an aqueous solution of sulfuric acid (75 parts), and upon neutralization of the cooled solution, the 3-(2,4-diamino-6-s-triazinyl)-3-hexanol is collected and yield is above 90%.

Example 10

In a like manner, α-hydroxy-α-hexyloctanenitrile is reacted with ethyl vinyl ether and the addition product is treated in the same way as in Example 9 and the acetal guanamine 1 - ethoxy-1-[α-(2,4-diamino-6-s-triazinyl)-α-hexyl-n-heptoxy]ethane is hydrolyzed to give the 7-(2,4-diamino-6-s-triazinyl)-7-tridecanol.

Example 11

In a similar manner, α-hydroxy-α-ethyldecanenitrile, when reacted with n-butyl vinyl ether, gives the addition product which reacted by a similar procedure gives the 1-butoxy-1-[α-(2,4-diamino-6-s-triazinyl-α-ethyl)n-nonoxy]ethane which upon hydrolysis with sulfuric acid gives the 3-(2,4-diamino-6-s-triazinyl)-3-hendecanol.

The substitution of α-hydroxy-α-ethyldecanenitrile by α-hydroxy-α-ethylhexanenitrile by the same procedure yields a product which is 1-(2,4-diamino-6-s-triazinyl)-2-ethyl-1-hexanol.

We claim:
1. Mandeloguanamine.
2. A process for preparing α-hydroxyguanamines of the formula

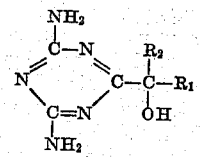

where $R_1$ and $R_2$ when taken individually are selected from the group consisting of hydrogen, alkyl radicals of not over 17 carbon atoms, the phenyl group, and alkylphenyl groups of not over 9 carbon atoms, the sum of carbon atoms in $R_1$ and $R_2$ being not over 20, and $R_1$ and $R_2$ when taken together with the carbon atom unto which they are both bonded form a cycloalkyl ring of 5 to 7 carbon atoms containing not more than a total of 10 carbon atoms, which comprises (1) reacting by intimately contacting in the presence of a strongly alkaline catalyst, in an inert organic solvent at a reacting temperature in the range from about 63° to about 210° C., dicyandiamide with an adduct obtained by bringing together in the presence of an acidic catalyst in an amount from about 0.01% to about 3% and at a reacting temperature between about 0° and about 120° C. an α-cyanohydrin of the formula

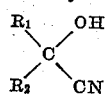

where $R_1$ and $R_2$ are defined as above and a vinyloxy substituted hydrocarbon compound of the formula $CH_2=CHOR_3$, where $R_3$ is selected from the group consisting of alkyl radicals containing not over 18 carbon atoms, and phenyl and benzyl radicals, whereby an acetal guanamine is formed, and (2) hydrolyzing the resulting acetal guanamine by treating it with an aqueous mineral acid in an amount of about 0.001 to about 1.5 mole per mole of starting α-cyanohydrin at a reacting temperature from about 20° to about 130° C., whereby an α-hydroxyguanamine is formed.

3. A process for preparing α-hydroxyguanamines of the formula

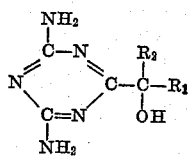

where $R_1$ and $R_2$ when taken individually are selected from the group consisting of hydrogen, alkyl radicals of not over 17 carbon atoms, the phenyl group, and alkylphenyl groups of not over 9 carbon atoms, the sum of carbon atoms in $R_1$ and $R_2$ being not over 20, and $R_1$ and $R_2$ when taken together with the carbon atom unto which they are both bonded form a cycloalkyl ring of 5 to 7 carbon atoms containing not more than a total of 10 carbon atoms, which comprises (1) reacting by intimately contacting in the presence of a strongly alkaline catalyst, in an alcoholic solvent boiling between about 63° and about 210° C. dicyandiamide with an adduct obtained by bringing together in the presence of an acidic catalyst in an amount from about 0.01% to about 3% and at a reacting temperature between about 0° and about 120° C. an α-cyanohydrin of the formula

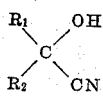

where $R_1$ and $R_2$ are defined as above and a vinyloxy substituted hydrocarbon compound of the formula $CH_2=CHOR_3$, where $R_3$ is selected from the group consisting of alkyl radicals containing not over 18 carbon atoms, and phenyl and benzyl radicals, whereby an acetal guanamine is formed, and (2) dissolving at least part of the resulting acetal guanamine and hydrolyzing it with an aqueous mineral acid in an amount of about 0.001 to about 1.5 mole per mole of starting α-cyanohydrin at a reacting temperature from about 20° to about 130° C., whereby an α-hydroxyguanamine is formed.

4. In the process of preparing an α-hydroxyguanamine of the formula where $R_1$ and $R_2$ when taken individually are selected from the group consisting of hydrogen, alkyl radicals of not over 17 carbon atoms, the phenyl group, and alkylphenyl groups of not over 9 carbon atoms, the sum of carbon atoms in $R_1$ and $R_2$ being not over 20, and $R_1$ and $R_2$ when taken together with the carbon atom unto which they are both bonded form a cycloalkyl ring of 5 to 7 carbon atoms containing not more than a total of 10 carbon atoms, wherein there are reacted at a reacting temperature between about 0° and about 120° C. in the presence of an acidic catalyst in an amount sufficient to bring the hydrogen ion concentration below a pH of 7.0, an α-cyanohydrin of the formula where $R_1$ and $R_2$ are as defined above and a vinyloxy substituted hydrocarbon compound of the formula $$CH_2=CHOR_3,$$

where $R_3$ is selected from the group consisting of alkyl radicals containing not over 18 carbon atoms, and phenyl and benzyl radicals, whereby a saturated adduct is formed, and wherein the resulting saturated adduct is reacted with dicyandiamide in the presence of a strongly alkaline catalyst and an alcoholic solvent at a reacting temperature between about 63° and about 210° C., whereby an acetal guanamine is formed, the steps of dissolving and hydrolyzing the said acetal guanamine by treating it with an aqueous mineral acid in an amount from about 0.001 to about 1.5 mole of acid per mole of acetal guanamine at a reacting temperature from about 20° to about 130° C. whereby an α-hydroxyguanamine is formed and recovering said α-hydroxyguanamine.

5. The process of claim 4 in which the mineral acid is hydrochloric acid.
6. The process of claim 4 in which the mineral acid is sulfuric acid.
7. A process for preparing α-hydroxyguanamines of the formula where $R_1$ and $R_2$ when taken individually are selected from the group consisting of hydrogen, alkyl radicals of not over 17 carbon atoms, the phenyl group, and alkylphenyl groups of not over 9 carbon atoms, the sum of carbon atoms in $R_1$ and $R_2$ being not over 20, and $R_1$ and $R_2$ when taken together with the carbon atom unto which they are both bonded form a cycloalkyl ring of 5 to 7 carbon atoms containing not more than a total of 10 carbon atoms, which comprises treating by intimately contacting an acetal guanamine of the general formula

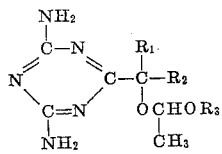

where $R_1$ and $R_2$ are defined as above and where $R_3$ is selected from the group consisting of alkyl radicals containing not over 18 carbon atoms, and phenyl and benzyl radicals, with an aqueous mineral acid in amount from about 0.001 to about 1.5 mole per mole of starting acetal guanamine at a reacting temperature from about 20° to about 130° C. whereby an α-hydroxyguanamine of the above formula is formed.

8. A process for preparing glycolguanamine which comprises dissolving and hydrolyzing the acetal guanamine 1-butoxy-1-[α(2,4-diamino-6-s-triazinyl)methoxy]ethane by treating it with an aqueous mineral acid in an amount from about 0.001 to about 1.5 mole of acid per mole of acetal guanamine at a reacting temperature from about 20° to about 130° C. whereby glycolguanamine is formed and recovering said glycolguanamine.

9. A process for preparing lactoguanamine which comprises dissolving and hydrolyzing the acetal guanamine 1-ethoxy-1-[α-(2,4-diamino-6-s-triazinyl)ethoxy]ethane by treating it with an aqueous mineral acid in an amount from about 0.001 to about 1.5 mole of acid per mole of acetal guanamine at a reacting temperature from about 20° to about 130° C. whereby lactoguanamine is formed and recovering said lactoguanamine.

10. A process for preparing α-hydroxy-isobutyroguanamine which comprises dissolving and hydrolyzing the acetal guanamine 1-butoxy-1-[α(2,4-diamino-6-s-triazinyl)-α-isopropoxy]ethane by treating it with an aqueous mineral acid in an amount from about 0.001 to about 1.5 mole of acid per mole of acetal guanamine at a reacting temperature from about 20° to about 130° C. whereby α-hydroxy-isobutyroguanamine is formed and recovering said α-hydroxy-isobutyroguanamine.

11. A process for preparing mandeloguanamine which comprises dissolving and hydrolyzing the acetal guanamine 1-ethoxy-1-[α-(2,4-diamino-6-s-triazinyl)benzoxy]ethane by treating it with an aqueous mineral acid in an amount from about 0.001 to about 1.5 mole of acid per mole of acetal guanamine at a reacting temperature from about 20° to about 130° C. whereby mandeloguanamine is formed and recovering said mandeloguanamine.

References Cited in the file of this patent

UNITED STATES PATENTS

| | | |
|---|---|---|
| 2,301,517 | Brunson | Nov. 10, 1942 |
| 2,309,680 | Thurston | Feb. 2, 1943 |
| 2,394,526 | Thurston | Feb. 5, 1946 |
| 2,425,615 | Gresham | Aug. 12, 1947 |
| 2,491,658 | Gresham | Dec. 20, 1949 |
| 2,579,412 | Aldelman | Dec. 18, 1951 |

FOREIGN PATENTS

| | | |
|---|---|---|
| 583,720 | Great Britain | Dec. 30, 1946 |